Figure 1:
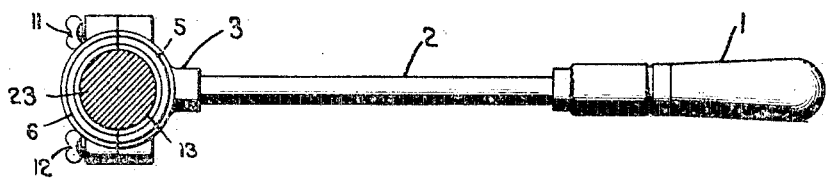

H. A. WHITE.
GRINDING AND TRUING APPLIANCE FOR SHAFTS.
APPLICATION FILED APR. 20, 1914.

1,117,734. Patented Nov. 17, 1914.

Witnesses.
J. Morrill Fuller
William E. Gagen

Inventor.
Henry A. White,
by Heard, Smith & Tennant
Atty's.

UNITED STATES PATENT OFFICE.

HENRY A. WHITE, OF SOUTH BRAINTREE, MASSACHUSETTS.

GRINDING AND TRUING APPLIANCE FOR SHAFTS.

1,117,734.

Specification of Letters Patent.

Patented Nov. 17, 1914.

Application filed April 20, 1914. Serial No. 833,251.

*To all whom it may concern:*

Be it known that I, HENRY A. WHITE, a citizen of the United States, residing at South Braintree, county of Norfolk, State of Massachusetts, have invented an Improvement in Grinding and Truing Appliances for Shafts, of which the following description, in connection with the accompanying drawing, is a specification, like characters on the drawing representing like parts.

This invention relates to improvements in appliances for grinding and truing shafts such as the crank shafts of engines, wrist pins and the like.

It is well known that the shafts or crank pins of engines become flattened upon the side which receives the impact from the piston and causes the pounding of the engine. In such cases the taking up of the bearings does not remedy the difficulty and it can only be cured by truing up the shaft to exact cylindrical form, inserting new bearings or babbeting the bearings to fit. This ordinarily requires highly skilled labor or returning the worn parts to the factory thus causing the loss of considerable time in the use of the machine.

One of the objects of the present invention is to provide a convenient tool which may be carried in any garage or machine shop or with an automobile kit of tools and which will grind and true the worn shafts to exact cylindrical form.

Another object of the invention is to provide an appliance which does not require the attention of a skilled machinist to properly true up the worn shafts or crank pins.

Other objects of the invention and the nature thereof will more fully appear from the following description and the accompanying drawings and will be particularly pointed out in the annexed claims.

Figure 2:
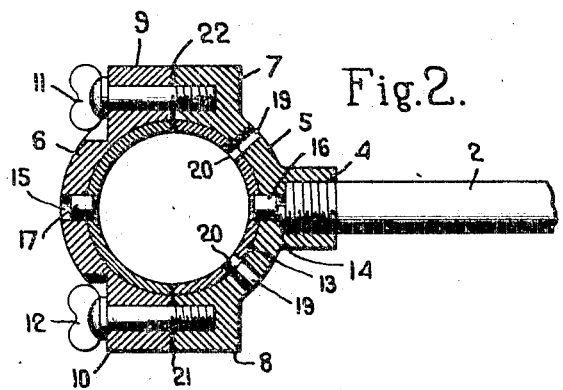
Figure 3:
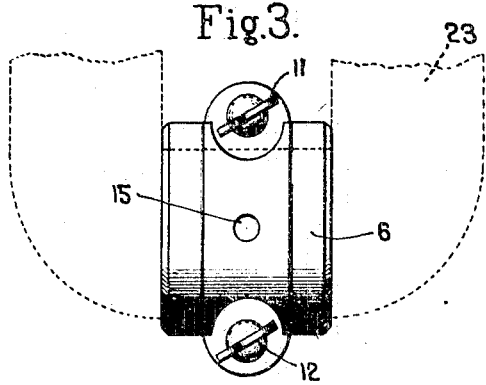

In the drawings: Figure 1 is a side elevation of a grinding and truing hand tool illustrated as applied to a crank shaft being ground, the shaft being shown in section, Fig. 2 is a vertical sectional view of the tool head and the inclosed bushing, Fig. 3 is an end view of the tool applied to a crank shaft which is being ground.

The appliance is illustrated herein as in the form of a hand tool having a handle 1 preferably of wood, and a shank 2 of steel which is desirably fastened into the head 3 of the tool by a screw threaded joint 4. It will be understood however that the appliance may be made in other forms and that the handle while forming a convenient means for manipulating the appliance is not necessarily essential to the invention.

The head 3 is desirably composed of two separable halves 5 and 6 which are preferably substantially cylindrical in form and have oppositely disposed flanges 7, 8, and 9, 10 which may be adjustably secured together by means of bolts 11, 12 provided with winged nuts or any other suitable fastenings. I prefer to use wing nuts for the reason that the adjustment is then made by the hand of the operator and there is less liklihood of clamping the grinding member or bushing too tightly upon the shaft, an error which would be likely to occur if a wrench were used to tighten these adjusting members. The members 5 and 6 are desirably provided with mating recesses or apertures, the walls of which are preferably circular in cross section to receive a bushing 13. The members 5 and 6 are also desirably provided with holes or countersunk recesses, 14, 15 adapted to receive dowel pins 16, 17 extending outward from the bushing 13. It will be understood however that the members 5 and 6 may be of different form and that the exterior of the bushing may be likewise of a different form providing the bushing is cylindrically apertured to fit upon the crank shaft to be ground. The member 5 of the head and also the inclosed bushing is provided with alined apertures 19, 20 leading from the outside of the head to the interior of the bushing preferably at each side of the handle shank 21, these apertures being provided to permit the introduction of oil and if desired suitable grinding material and being disposed upon opposite sides of the handle in order that the tool may be used either as a right handed or left handed tool.

I contemplate the use of bushings of various sizes which may be kept in stock or which may be turned on an ordinary lathe to substantially the desired size without any great inconvenience. These bushings are preferably made of hardened steel and are grooved after the lathe tool has passed through them. This however is not important since the device will work properly whether the walls of the aperture are smooth or slightly roughened. In use a bearing is selected which is approximately the size of the shaft to be trued but preferably slightly larger than the shaft, the head portion 6 is unclamped from the tool and the bushing inserted, and head 6 then clamped upon the tool inclosing the bushing in the manner shown in Fig. 3. It is desirable that the internal diameter of the bushing be such that the parts when thus assembled will not quite come together leaving longitudinal divisional slots 21 and 22 between the edges of the bushing to permit the same to be taken up as the shaft is ground down.

In the operation of the appliance, while oil and a suitable grinding material such as flowers of emery or Turkish emery may be introduced through the apertures 19, 20 between the interior cylindrical surface of the bushing and the shaft which is to be ground, preferably the shaft is coated with a grinding material such as that above described mixed with a lubricant before the tool is placed upon the shaft and thereafter oil is introduced through the apertures 19, 20 as the grinding proceeds. When the tool is thus applied to the shaft the shaft may be held stationary and the tool rotated about the same but preferably the tool is held by the handle and the engine turned over by hand or by power as may be most convenient. There is relatively little resistance upon the tool and no difficulty is found in holding the same properly during the grinding operation. It is found in practice that a comparatively few number of turns will serve to true up a slightly worn shaft or crank pin and that a badly worn crank pin may be readily trued up to exact cylindrical form by a somewhat longer usage of the tool and by turning up the adjusting screws 11 and 12 as the shaft is being ground down. As the grinding proceeds oil is fed in through the apertures 19, 20 and serves to facilitate the grinding and also to carry off particles of metal which have been ground off the shaft and bushing through the slots 21, 22. By the frequent injection of oil the amount of grinding material is gradually lessened as the grinding proceeds and when the operation is finished it is substantially eliminated so that in the latter part of the grinding and truing operation the shaft is practically given an oil polish leaving its surface smooth and mirror-like.

It is desirable that the handle of the tool be made of wood, not only for convenience in operation by hand but in order that the same may not injure the parts of the engine when the crank pins are being ground. For example, in grinding the crank shafts of automobile engines the tool may be applied to the crank shaft and the wooden handle 1 permitted to rest against the wall of the crank case. The operator may then turn the engine over by hand permitting the tool handle to reciprocate back and forth in the crank case until the crank shaft is sufficiently ground and true. It is also possible to insert the handle within the cylinder of the engine after the piston has been removed and thereafter clamp the head upon the shaft in the manner aforesaid and perform the grinding operation by turning over the engine in any suitable manner.

It is to be understood that the embodiment of the invention disclosed herein is illustrative merely and is not restrictive and that where the members 5 and 6 of the head are made with a cylindrical aperture to receive the bushing the head itself may be used as a grinding and truing member without the insertion of a bushing since it has been found in practice that either soft steel of cast iron will afford a good surface for causing the abradant to operate properly upon the shaft which is being trued.

It is obvious that this grinding mechanism may be utilized in a machine as well as in the form of a tool disclosed herein, it is also apparent that this invention is adapted to various uses. It is to be understood therefore that the claims annexed hereto are intended to cover all forms in which the invention may be embodied and all uses to which it may be applied.

Having thus described my invention what I claim as new and desire to secure by Letters Patent is:

1. A device of the class described comprising a handle member having a head, a cylindrical aperture in said head adapted to receive and to fit snugly a shaft or crank pin to be trued, means for introducing an abradant between the inner wall of said aperture and the surface of said crank and means for relatively rotating said member and said shaft.

2. A grinding and truing appliance comprising a member having an apertured head, a cylindrical apertured bushing secured therein adapted to receive and to fit a shaft or crank pin to be trued and having an aperture extending through the walls of said head and said bushing whereby a lubricant or polishing material may be introduced between the surface of said bushing and said shaft and means whereby said member may be rotated relatively to said shaft.

3. A grinding and truing appliance comprising a member having a handle, a transversely apertured head formed in separable and relatively adjustable parts, means for relatively adjusting the same, a bushing having a cylindrical aperture secured in said head adapted to receive and to fit a crank to be trued, and means whereby said member may be rotated relative to the crank pin.

4. A grinding and truing appliance comprising a member having a head formed in two separable and relatively adjustable parts and means for adjusting the same, an aperture, the walls of which are embraced in said separable parts, a bushing having a cylindrical aperture secured in said head, adapted to receive and fit a crank pin to be trued, means whereby said member may be rotated relative to said head, means for introducing a lubricant between said bushing and said shaft, and means adapted to permit the abrasive material to escape as the operation proceeds.

5. A grinding and truing appliance comprising a member having a head formed in two separable relatively adjustable parts one of said members being provided with a wooden handle, a cylindrical bushing adjustably secured to said head sections and forming a cylindrical aperture, and means for securing the sections of a head and bushing together whereby the same may be applied to a crank shaft.

In testimony whereof, I have signed my name to this specification, in the presence of two subscribing witnesses.

HENRY A. WHITE.

Witnesses:
FREDERICK A. TENNANT,
THOMAS J. DRUMMOND.